Figure 1:
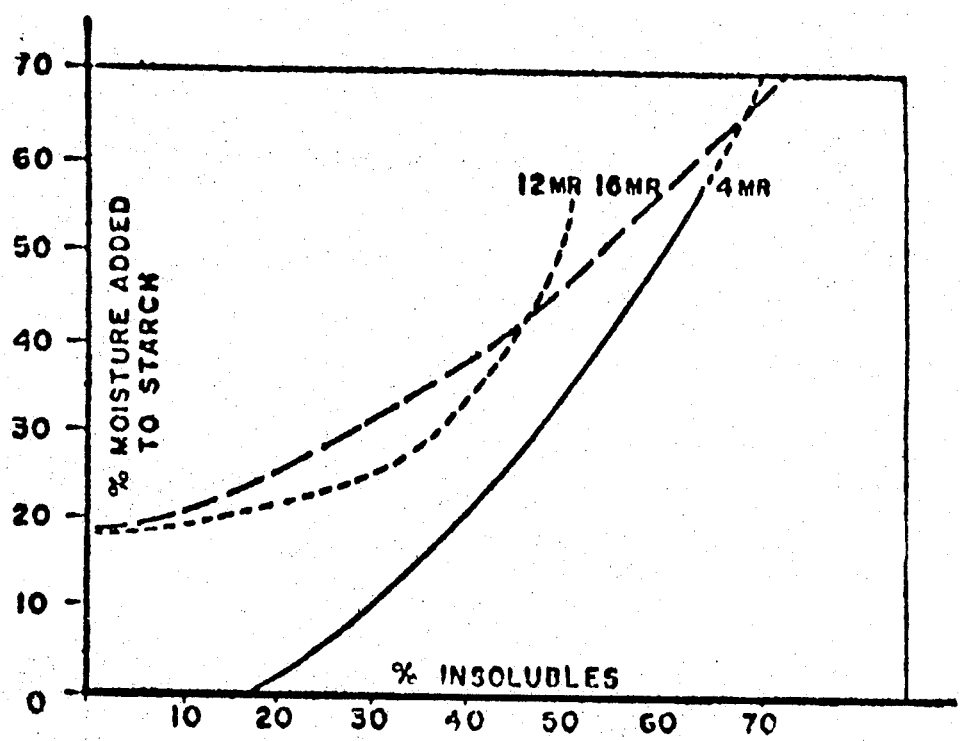

United States Patent [19]
Schirmer

[11] 3,870,609

[45]*Mar. 11, 1975

[54] IRRADIATED INSOLUBLE AMYLOSE STARCH

[75] Inventor: Henry G. Schirmer, Spartanburg, S.C.

[73] Assignee: W. R. Grace & Co., Duncan, S.C.

[ * ] Notice: The portion of the term of this patent subsequent to Sept. 23, 1986, has been disclaimed.

[22] Filed: Jan. 25, 1971

[21] Appl. No.: 109,590

Related U.S. Application Data

[62] Division of Ser. No. 822,763, Jan. 23, 1969, abandoned, which is a division of Ser. No. 455,771, May 14, 1965, Pat. No. 3,468,777.

[52] U.S. Cl................ 204/160.1, 100/162, 219/68, 260/233.3, 264/22
[51] Int. Cl.² ........................................... C08b 1/00
[58] Field of Search................ 204/160.1; 260/233.3

[56] References Cited
FOREIGN PATENTS OR APPLICATIONS
| | | |
|---|---|---|
| 832,746 | 4/1960 | Great Britain |
| 871,634 | 6/1961 | Great Britain |

*Primary Examiner*—Murray Tillman
*Assistant Examiner*—Richard B. Turer
*Attorney, Agent, or Firm*—John J. Toney; William D. Lee, Jr.

[57] ABSTRACT

This invention is directed to an irradiated starch with an increased insolubility and a high amylose content having at least about 20 percent insolubles in boiling water and 20 percent amylose and prepared by intimately contacting the starch with water to increase its moisture content and irradiating to a dosage of less than 10 megarads, all as further described herein.

10 Claims, 2 Drawing Figures

IRRADIATED INSOLUBLE AMYLOSE STARCH

This application is a division of my prior copending application Ser. No. 822,763, filed on Jan. 23, 1969, and now abandoned which was a division of Ser. No. 455,771, filed May 14, 1965, now U.S. Pat. No. 3,468,777.

This invention relates to starch having a high amylose content. In one aspect, the invention relates to a method for treating a starch having a high amylose content. In another aspect, the invention relates to increasing the insolubility in boiling water of amylose starch.

Starch is a mixture of high molecular weight natural polymers and may be obtained from a number of sources such as potato, tapioca, and corn. The mixture is essentially two fractions: amylose, a straight chain linear fraction and amylopectin, a branched chain fraction. Both fractions are polysaccharides consisting of d-glucopyranose units combined by 1-4 alpha linkages. Due to these differences in molecular structure, there are vast differences in the amylose and amylopectin fractions. In general, the amylopectin is soluble in water and the amylose is insoluble in cold water, but soluble in boiling water.

Each of the fractions have uses which make them of interest for commercial applications, particularly where a soluble film is to be used; however, the amylose is generally most useful and a number of attempts have been made and are still being made to produce a corn which has a naturally high amylose content that is above 85%; however, these starches are still highly soluble in boiling water even though they may be substantially insoluble in cold water.

It is an object of the invention to provide a starch which is insoluble in boiling water.

It is another object of the invenntion to provide a method for increasing the insolubility in boiling water of starch.

It is another object of the invention to provide a method for treating a film prepared from starch having a high amylose content to increase its insolubility in boiling water.

These and other objects of the invention will be readily apparent to those skilled in the art from the following description and appended claims.

It has now been surprisingly found that if starch having a high amylose content is first intimately contacted with water and then irradiated to a dosage of less than 10 megarads that the resultant starch contains an increased proportion of material which is insoluble in boiling water. This is most surprising since it is known in the art that irradiation of amylose starch to a dosage of 10 to 100 megarads (MR) results in a product which is more soluble, (British Pat. No. 832,746).

This invention is broadly applicable to starch from whatever source derived having a high amylose content. Preferably, the starch contains at least 60 per cent, more preferably 80 to 100 per cent, amylose. The high amylose content starch may be obtained from any suitable source such as fractionation of starch and starch naturally containing amylose content. The amylosic material may be relatively pure amylose, derivatives of amylose such as hydroxethyl amylose or high amylose starch and mixtures thereof. In general, starch is hygroscopic and will retain or regain up to about 10 weight per cent moisture.

The starch may be employed in any suitable form or structure such as films, filaments or other elongated members. For simplicity, the invention will be described with reference primarily to films but is not to be so limited. The films may be prepared from amylosic materials by casting a solution of the material in a solvent onto a suitable surface and then peeling the resultant gel from the surface. Film may also be prepared by extruding a plasticized amylosic material. If the amylosic material is to be extruded, it is generally preferred to combine it with a compatible plasticizer to provide a pseudo thermoplastic composition and then extrude the composition. Suitable plasticizers include the polyhydric alcohols, with glycerine being preferred, and the invert sugars, corn syrup, d-sorbitol and hydroxypropyl glycerine. The selection of suitable extrusion compositions and conditions are well within the skill of the art; for example, a suitable composition for extrusion would include 50–70 weight per cent amylosic material, 0–29 weight per cent plasticizer and 20–50 weight per cent water. The liquid and dry materials are admixed by any suitable means such as by a blade mixture, a Muller type mixer or a twin shell blender.

Although it is known to employ water to plasticize the extrusion mixture, the water escapes from the hot extrudate and during subsequent drying so that the starch contains very little moisture although there is some regain of moisture to about 10 percent. It is, therefore, surprising to discover that if a starch having a high water content is irradiated with a dosage of less than 10 megarads that the gel content (weight per cent insolubles in boiling water) is increased. The water may be added to the film after drying or the water may be added prior to extrusion or casting. Preferably, the water content of the starch immediately prior to irradiation is at least 10 per cent, more preferably in the range of 20 to 70 weight per cent. The film may be sprayed with water, dipped in water or otherwise intimately contacted with water. Apparently, the film absorbs the water. After irradiation the moisture is lost due to evaporation or drying to about 10 weight per cent. After irradiation the gel content (insolubles in boiling water) is increased, preferably to at least 20 weight per cent, more preferably to a range of 30 to 70 weight per cent based on the irradiated sample weight.

The films or other structures prepared by the method of this invention are particularly useful as wrapping material for sausages and meats or packages of frozen vegetables or other refrigerated foods. In general, the film is used in substantially any manner employing other films prepared from potato starth, methylcellulose and carboxymethylcellulose. In the non-food packaging field, polyvinyl alcohol and polyethylene oxide films are competitors.

The invention is best described with reference to the following example.

A film having thickness of about 3 mils and prepared by casting (extruding or casting) corn starch was sprayed with water at room temperature. The starch had a particle size of 10–100 microns and contained about 10 percent moisture. On a dry basis, the starch contained about 97 per cent starch carbohydrates including 70 per cent amylose. The starch was substantially soluble in boiling water and was 95 per cent soluble in cold water. The starch had a density of 1.46 g./cc. at 25°C. (as determined from the technical sheet for Napol L starch by A. E. Staley, Decatur, Ill.).

Different samples were sprayed with different amounts of water so that the amount of water added varied from 0 to about 60 weight per cent of the original weight of the film. The respective samples were then irradicated with electrons to dosages of from 0-4 MR and the actual moisture content of the irradiated sample after drying was then determined as well as the per cent insoluble material in boiling water. These results are shown in the following table and are further depicted in FIGS. 1 and 2 attached.

TABLE I

| Sample No. | Water Added % (1) | Irradiation Dosage Magarada | Insolubles % (2) |
|---|---|---|---|
| 1 | 29.7 | 12 | 36.9 |
| 2 | 30.2 | 4 | 47.5 |
| 3 | 18.5 | 12 | 0 |
| 4 | 36.8 | 16 | 37.9 |
| 5 | 22.4 | 4 | 42.1 |
| 6 | 9.4 | 8 | 0 |
| 7 | 21.6 | 16 | 15.0 |
| 8 | 15.7 | 12 | 0 |
| 9 | 20.2 | 20 | 17.9 |
| 10 | 19.4 | 8 | 32.9 |
| 11 | 57.6 | 4 | 63.2 |
| 12 | 48.1 | 8 | 57.0 |
| 13 | 55.8 | 12 | 50.4 |
| 14 | 57.2 | 16 | 60.8 |
| 15 | 0 | 4 | 16.2 |
| 16 | 0 | 8 | 17.9 |
| 17 | 0 | 12 | 0 |
| 18 | 0 | 16 | 0 |
| 19 | 0 | 20 | 0 |
| 20 | 0 | 40 | 5.5 |
| 21 | 0 | 0 | 0 |

(1) Based on original film weight
(2) In boiling water, based on irradiated sample weight (Average of two samples)

FIG. 1 is a plot of the data in the table and illustrates that the per cent insoluble material is increased as the per cent water added to the film is increased.

Figure 2:
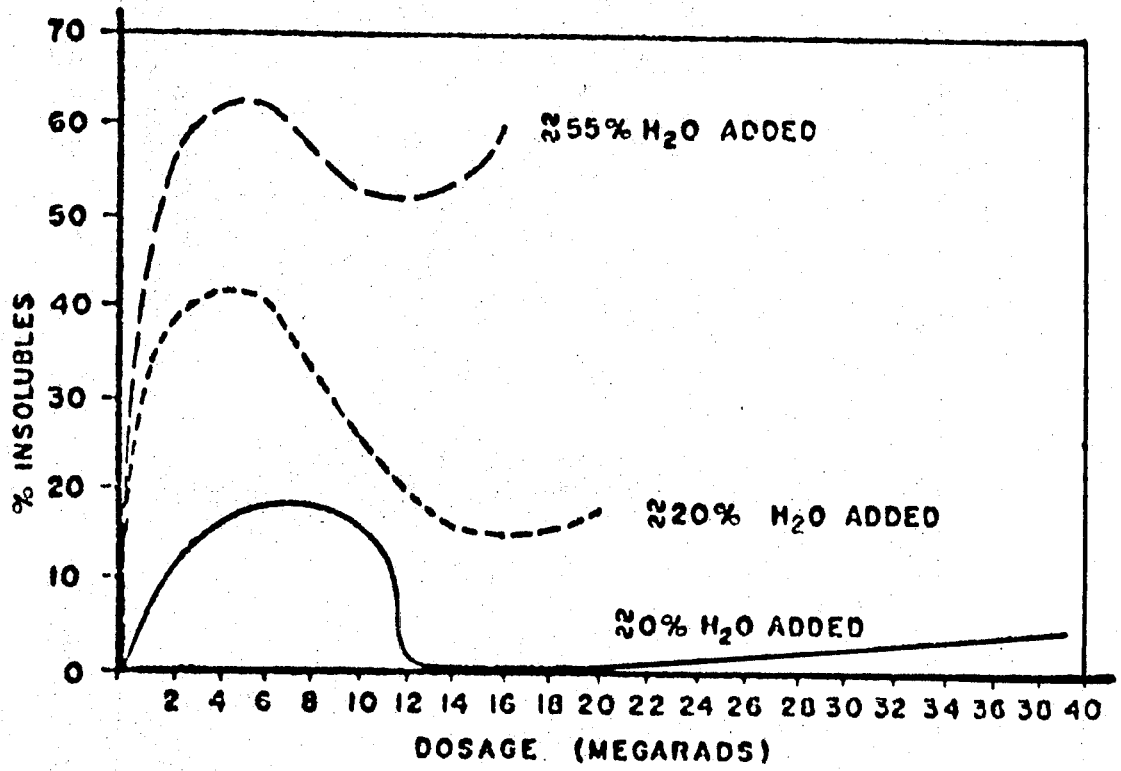

FIG. 2 was prepared from the curves of FIG. 1 and dramatically points out the surprising fact that there is a critical range for dosage in which insolubility is increased.

These data demonstrate that if no water is added to the film prior to irradiation the per cent gel is a maximum of about 18 at 6 MR. However, if only 20 per cent water is added then the per cent of gel is increased to a maximum of about 40 per cent at 4 MR and at 55 per cent water the gel is increased to a maximum of about 62 per cent at about 5 MR. In each case as the amount of irradiation is increased the per cent gel is drastically reduced after the peak has been reached.

A REP as recognized in the art is defined as that amount of nuclear irradiation which dissipates 93 erge of energy per gram of tissue producing $1.61 \times 10^{12}$ ion pairs in the process. An alternative unit is the Rad which is defined as representing 100 erge of energy per gram imparted by ionizing particles to the irradiated material at the point of interest, Glasstone *Principles of Nuclear Reactor Engineering*, (1955) page 547.

The polymer is generally subjected to irradiation at ambient temperatures with the reduction in solubility proceeding more rapidly at elevated temperature.

The web or film or filament may be of any suitable dimensions so long as the irradiation is effective for reducing solubility of the polymer unit.

Irradiation can be accomplished by various methods. Thus, there can be used electrons, X-rays, gamma rays by employing iron 59 or cobalt 60, beta rays, e.g., by employing cobalt 60, carbon 14, phosphorus 32, strontium 90, and ultra-violet light. Preferably, electrons of at least $10^5$ electron volts energy are employed. A suitable irradiation source is a Van de Graaff type electron accelerator manufactured by the High Voltage Engineering Corporation, Burlington, Mass., operated at 2,000,000 volts and a power output of 500 watts. Alternatively, there can be employed other sources of high energy electrons, such as the General Electric 2,000,000 volt, 10 KW, Resonant Transformer unit or the corresponding 1,000,000 volt, 5 KW, General Electric Resonant Transformer or a linear accelerator.

The time of irradiation is not critical but need merely be sufficient to give a dosage of sufficient REP. The voltage, likewise, can be varied quite widely, but for rapid irradiation of thick or multi-layer materials is desirably high, e.g., 750,000 to 1,000,000 or 2,000,000 or 3,000,000 or 6,000,000 volts, or even higher. By appropriate combination of time of treatment, voltage and beam current, the desired dosage is obtained.

Preferably, the irradiation dosage is less than 10 megarads (MR), more preferably, in the range of 2 to 8 MR.

While certain examples, structures, composition and process steps have been described for purpose of illustration, the invention is not limited to these. Variation and modification within the scope of the disclosure and the claims can readily be effected by those skilled in the art.

I claim:

1. A method for increasing the insolubility of starch having a high amylose content comprising
   a. intimately contacting said starch with water and then
   b. irradiating said starch to a dosage of less than 10 megarads and sufficient to increase the insolubility of the starch in boiling water to at least 20 per cent and to yield an irradiated starch of at least about 20 per cent amylose content.

2. A method for increasing the insolubility of starch having an amylose content of at least 60 per cent comprising
   a. intimately contacting said starch with water to raise the moisture content to at least 20 per cent and then
   b. irradiating the resultant starch to a dosage of less than 10 megarads and sufficient to increase the insolubility of the starch in boiling water to at least 20 per cent and to yield an increased starch of at least about 20 per cent amylose content.

3. A methof for preparing an elongated member from starch comprising
   a. forming an elongated member from starch having a high amylose content,
   b. intimately contacting said member with water to increase its moisture content, and
   c. irradiating the treated member with a dosage of less than 10 megarads and sufficient to increase the insolubility of the starch in boiling water to at least 20 per cent and to yield an irradiated starch of at least about 20 per cent amylose content.

4. A method for preparing an elongated member from starch conprising
   a. intimately admixing water with starch having a high amylose content, b. forming an elongated member from the treated starch, and c. irradiating the elongated member with a dosage of less than 10 megarads and sufficient to increase the insolubility of the starch in boiling water to at least 20 per cent and to yield an irradiated starch of at least about 20 per cent amylose content.

5. A method for preparing a web from starch comprising a. forming a web from a starch having a high amylose content, said web being substantially completely soluble in boiling water, b. intimately contacting said web with water to increase its moisture content to at least 10 per cent, c. and irradiating the thus treated member with a dosage of less than 10 megarads and sufficient to increase the boiling water insolubles content of said starch to at least 20 percent and to yield an increased starch of at least about 20 per cent amylose content.

6. The method of claim 5 wherein said web is sprayed with water.

7. The method of claim 5 wherein said moisture content is in the range of 20 to 70 per cent.

8. The method of claim 5 wherein said dosage is in the range of 2 to 8 megarads.

9. The method of claim 5 wherein said insolubles content is in the range of 30 to 70 per cent.

10. A method for preparing a film from starch comprising a. extruding starch through a die to form a film, said starch having an amylose content in the range of 80 to 100 per cent and being substantially completely soluble in boiling water, b. spraying water onto the surface of said film to increase the moisture content to 20 to 70 per cent, c. and irradiating the thus treated film with a dosage in the range of 2 to 8 megarads and sufficient to increase the boiling water insolubles content to 30 to 70 per cent.

* * * * *